UNITED STATES PATENT OFFICE.

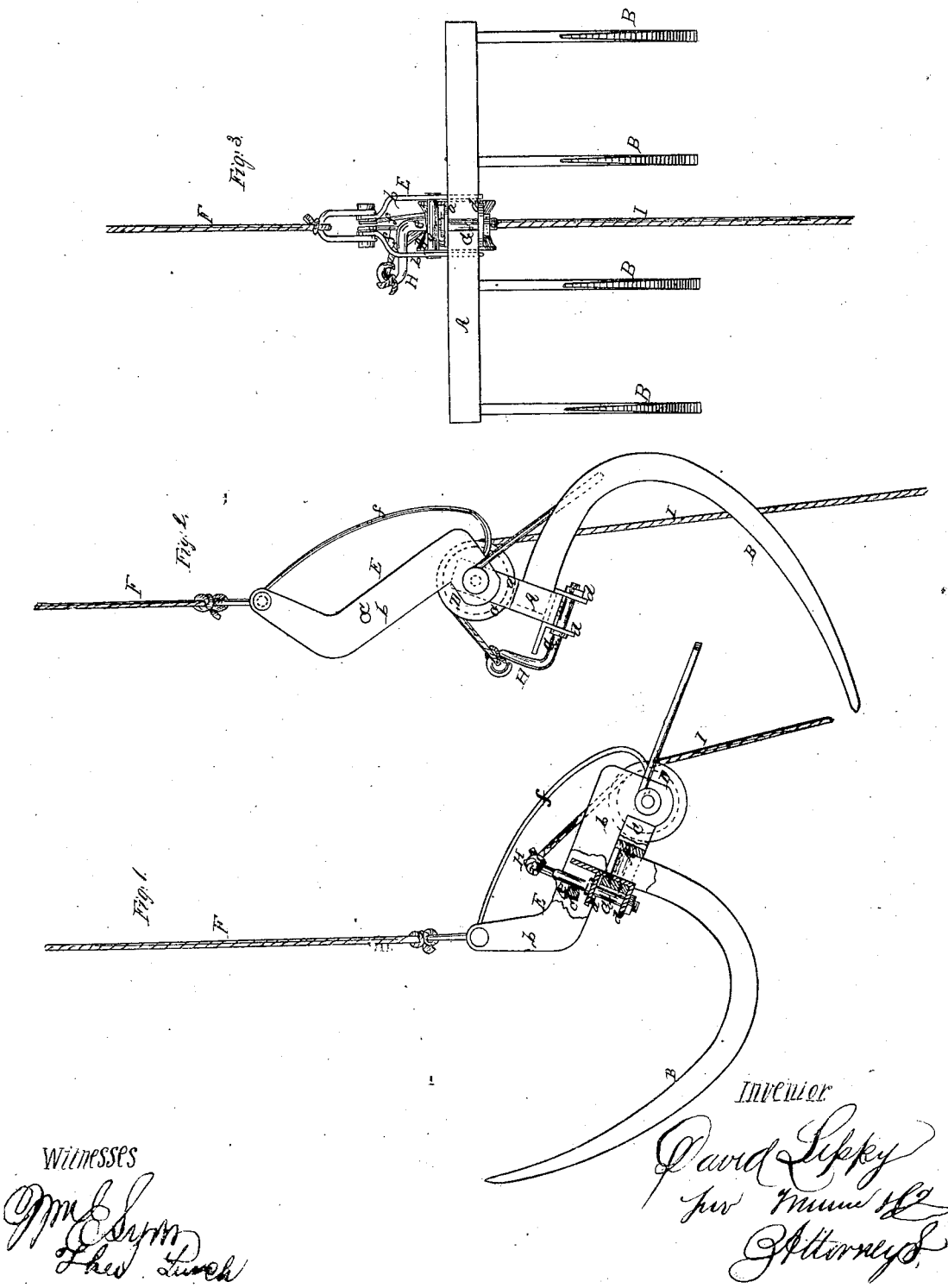

DAVID LIPPY, OF MANSFIELD, OHIO.

IMPROVEMENT IN HORSE HAY-FORKS.

Specification forming part of Letters Patent No. 51,950, dated January 9, 1866.

*To all whom it may concern:*

Be it known that I, DAVID LIPPY, of Mansfield, in the county of Richland and State of Ohio, have invented a new and Improved Horse Hay-Fork; and I do hereby declare that the following is a full, clear, and exact description thereof, which will enable those skilled in the art to make and use the same, reference being had to the accompanying drawings, forming part of this specification, in which—

Figure 1 is a side view of my invention, partly in section, representing my improved fork in a working position as when being elevated with a load; Fig. 2, a side view of the same in a tripped position, or the position it assumes in order to discharge its load; Fig. 3, a front view of the same in a working position.

Similar letters of reference indicate corresponding parts.

The invention relates to a new and improved hay-fork of that class which are used for elevating hay by means of a horse from a load and depositing it in mows in barns.

The invention consists in a novel and improved tripping device, as hereinafter fully shown and described, whereby the load may be readily discharged from the fork at any point in the path of the elevation of the latter, and the casual or accidental tripping of the fork prevented.

A represents the head of the fork, and B the tines. These parts may be constructed in the usual or in any proper manner, and from the rear side of the head A, at its center, an arm, C, projects about at right angles, which arm may be constructed of two parallel plates, *a a*, having a pulley, D, fitted between them at their outer ends.

E represents what is commonly termed a "bail," which is of bent form, as shown clearly in Figs. 1 and 2, and is composed of two plates, *b b*, connected by the axle of the pulley D to the arm C, the bail being allowed to work or turn freely on said axle.

The hoisting-rope F is attached to the outer end of the bail E, and a rod, *c*, passes transversely through the bail, the use of which will be presently shown.

To the front side of the rake-head A, at about its center, there are attached two projecting plates, *d d*, which serve as bearings for a rod, G, having upon it a projecting lip, *e*, to catch over the rod *c* in the bail E and secure the fork in a working position, as shown in Figs. 1 and 3. The upper end of this rod G has a crank, H, to which the tripping-rope I is attached, and this rope passes over the pulley D and between guide-rods *f f*, attached to the rear side of the bail.

The fork is hoisted by the usual tackle, the rope F passing over a pulley at the top of the barn, and, extending down, passes underneath a pulley at the lower part of the barn, a horse being attached to the lower end of the rope F. When the fork is loaded and secured by the lip *e* of the rod G catching over the rod *c* in the bail E the crank H is at right angles with the bail, as shown clearly in Fig. 3, and it will be seen that by pulling the rope I the rod G will be turned and the lip *e* moved off from the rod *c*, and the fork will drop or tilt to the position shown in Fig. 2, and the load will be discharged. The empty fork is then allowed to descend by backing the horse, and loaded by thrusting its tines into the hay, the bail E secured to its former position by turning the lip *e* over the rod *c* in the bail after the latter has been adjusted in a proper relative position with the head A, and the fork again raised by starting the horse forward. By this arrangement a very simple and efficient tripping device is obtained, one which cannot become casually or accidentally moved, and which may be operated with the greatest facility.

Having thus described my invention, I claim as new and desire to secure by Letters Patent—

The rod G, provided with a crank, H, to which the tripping-rope I is attached, and also provided with a lip, *e*, and attached to the head A of the fork, in combination with the bail E, connected to the arm C of the fork-head A, and provided with a rod, *c*, for the lip *e* of rod G to catch over, all arranged substantially as and for the purpose herein set forth.

DAVID LIPPY.

Witnesses:
M. VAN B. FINFROCK,
W. C. MARKWARD.